March 18, 1969   R. J. LAHR   3,433,564
VACUUM TRANSPARENCY HOLDER AND OPTICS
Filed June 15, 1966

INVENTOR.
ROY J. LAHR

BY *John A. Brady*
ATTORNEY.

United States Patent Office 3,433,564
Patented Mar. 18, 1969

3,433,564
VACUUM TRANSPARENCY HOLDER AND OPTICS
Roy J. Lahr, Lexington, Ky., assignor to International Business Machines Corporation, Armonk, N.Y., a corporation of New York
Filed June 15, 1966, Ser. No. 557,713
U.S. Cl. 355—76  3 Claims
Int. Cl. G03b 27/64

ABSTRACT OF THE DISCLOSURE

A transparency is held in place for optical viewing at the object plane of the viewing apparatus by providing a porous, fritted glass plate having one side located at the object plane and forming one wall of a closed chamber. A vacuum pump is provided which is connected to the chamber so that a pressure differential between the two sides of the plate can be created. When the pressure on the object plane side is made greater than that in the closed chamber by partially evacuating the air from the chamber, the transparency will be held and supported in place on the glass plate by air pressure. When it is desired to remove the transparency, the pressure in the closed chamber is increased by the pump to permit the transparency to be removed and also to force air through the pores of the plate to blow out any dirt and impurities from the plate which were brought in during the application of the vacuum to the closed chamber.

Disclosure of the invention

This development uses atmospheric forces by providing a porous body of light transmitting material in the optical path. An air pressure differential is generated on one side of the body and this is transmitted to a transparency carrying an image through the pores of the body. The transparency is thus tightly held for optical viewing while the optical path is effective to direct light through the body, then through the transparency, and then through suitable optics to form the final image. The pressure differential may push in dust and other foreign particles which would tend to clog the pores of the body, and in this event, means are provided to periodically reverse the direction of the pressure differential to thereby blow out such particles and thus keep the pores clean.

The projection of an image from a negative or other transparency is, of course, very common. Some systems hold the negative permanently in an aperture formed as a part of a conventional tabulation card. Often the negative is a small or "microfilm" negative storing information in a size greatly reduced from its original size. In virtually any such system, suitable optics structures are provided to project a light image of the negative in some preselected manner or place.

In the most conventional optical structures, which are both economic and reasonably effective, it is necessary to hold the entire transparency in the exact plane (called the object plane) from which the lenses which form the final image are designed to receive the image. The entire image is then simultaneously projected by the optics onto some preselected place (called the focal plane). If all of the portions which define the image are not exactly in place on the object plane, at least part of the image projected will be out of focus.

It is common to mechanically grip in place the negative, film strip, aperture card with film "chip," or other transparency by a clamping action between two flat pieces of glass or other clear material. However, this often leads to scratching or the imbedding of dirt into the transparency. If the transparency is a conventional silver halide type of photographic film, the physical contact on the emulsion side is quite delicate and subject to permanent injury.

Non-uniform contact of clamping surfaces or other surfaces of a mechanical gripping system may produce distortions causing optical interference patterns to appear In particular, Newton rings may often appear in the projected image. Such patterns or visual insertion onto the projected image are, of course, undesirable. When the two clear glass clamping surfaces are used, interference patterns usually occur because of the very small distances between the "hills" and "valleys" of the two glass surfaces.

It is known to attempt to avoid the above disadvantages of mechanical gripping by providing means to hold the transparency with the action of atmospheric pressure. In all of the several systems found which use atmospheric pressure, however, the atmospheric force was applied only along the sides of the transparency or of a frame holding the transparency during optical viewing. The middle of the transparency was under no pressure and could sag, deform, bow out, or otherwise take up an uneven surface. The resulting image therefore could often be an imperfect and partially out of focus reproduction of the original material on the transparency. If the transparency had become slightly deformed by prior environmental conditions, significant imperfections of the kind just mentioned were even more possible because the forces in these prior art systems were not directed to give a strong tendency to smooth these deformations.

It is an object of this invention to provide a strong transparency holding optical system which is effective without substantial contact of solid materials on one side of the transparency.

It is another object of this invention to provide a transparency holding optical system which eliminates any scratching or any imbedding of dirt onto one side of the transparency.

It is a further object of this invention to provide a transparency holding optical system which forces the transparency by an even pressure so that interference patterns and other optical distortions are minimized.

It is still another object of this invention to provide a transparency holding optical system which provides a strong, positive force tending to flatten the transparency across the entire surface of the transparency.

The foregoing and other objects, features and advantages of the invention will be apparent from the following more particular description of preferred embodiments of the invention, as illustrated in the accompanying drawings.

Figure 1:
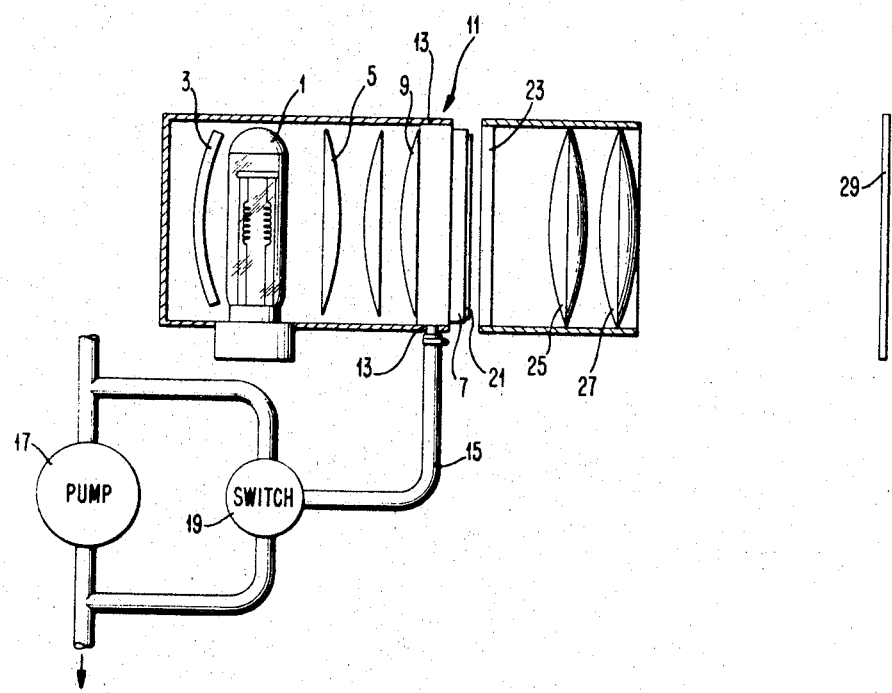
FIGURE 1 is a view from the side of an optical path in accordance with this invention, the more conventional structures being illustrated somewhat illustratively.

Reference is made to FIG. 1. Light is generated by a high intensity source or bulb 1, which may be a conventional incandescent lamp, but is preferably an exceptionally high energy source. In accordance with this invention some of the light directed toward the film may be scattered and lost, and therefore an exceptionally high energy light source is usually desired.

Reflector 3 and lens 5 are not intended to be considered as being specific disclosures, but instead are intended to represent any means to collect and direct large amounts of light from source 1 toward the film holding plate 7. Similarly, lens 9 is also an indication only of further optics structure to direct a maximum of the light from source 1 in an even pattern onto the film holding plate 7.

A closed chamber 11 is formed by lens 9, plate 7, and chamber sides 13. Conduit 15 is in communication with chamber 11 and ultimately with pump 17. Pump 17 is associated with, and the direction of pressure is controlled by, a switch 19, which may be reversed so that, in one position of switch 19 pump 17 draws a vacuum in chamber 11, while in another position of switch 19 pump 17 creates a pressure greater than atmospheric in chamber 11. Pump 19 thereby can control the ambient air pressure on the side of plate 7 normally away from or distal to the side on which transparency 21 is normally positioned.

Film holding plate 7 may be of any material which transmits light. The material is porous throughout its width. It may, for example, be a plate of sintered glass pieces. The preferred material of plate 7 is Pyrex Type 7740, a commercial micro-porous glass, the product of Corning Glass Works, having passages within the range of 10–15 microns in size. This is a fritted glass made by a proprietary process basically similar to sintering. The preferred thickness of plate 7 is about one-sixteenth inch. Tests have been run, however, with an extra course (passages 175–220 microns in size) Type 7740 flat plate three-thirty seconds inch thick. This pore structure is quite gross compared to the smaller pores which, as mentioned above, are preferred. This glass of gross pore structure was milky white in appearance and not observably transparent. The image obtained was clear and sharp. Illumination was by one 100 watt bulb with transparent envelope, with optics except as otherwise stated being conventional slide projector optics. There was no apparent loss in image resolution. The light areas of the image did show a weak, blurred grain or speckled pattern created by the gross pore structure of the plate. For that reason, a small pore structure, in which the background pattern is negligible and the light areas therefore appear substantially uniform, is preferred.

The film or transparency 21 may be moved in and out of proximity with plate 7 by any suitable means. A solid glass plate 23 is provided merely as a front guide for moving the transparency 21, but this is entirely optional.

The lenses 25 and 27 are illustrative merely of any optical system which focuses an image from an object plane onto a focal plane. In this case, the image from transparency 21 is focused on plate 29, which may be a photosensitive surface used in a copying process or may simply be a fogged, translucent surface upon which the image will be projected for viewing by the human eye.

Figure 2:
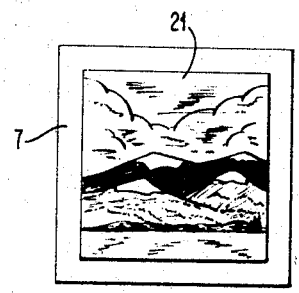
FIGURE 2 is a front view showing a transparency held against the porous plate of light transmitting material.

The operation of this system will be largely apparent from the above description of structure. When the transparency 21 is moved in place in front of the plate 7 in the general relationship shown in FIG. 2, the switch 19 is activated to cause pump 17 to draw a vacuum. Assuming light source 1 is activated, the remaining functions are automatic. Pressure up to atmospheric, depending on the extent of the vacuum, appears across the entire surface of transparency 21 and transparency 21 is therefore pushed firmly against plate 7. A force of 5 to 6 pounds per square inch is generally sufficient. The position of transparency 21 when it is flat against the surface of plate 7 is preselected to correspond to the object plane for the optical path made up of lenses 25 and 27; that is, the side of plate 7 away from light source 1 is positioned to locate transparency 21 on the object plane. An excellent light image of the contents of transparency 21 is automatically focused on plate 29.

This is all accomplished by a mechanism in which the outer side of transparency 21 is not contacted by any solid object. Therefore, the outer side of transparency 21 will be the most delicate side of the transparency 21, for example the gelatin side of a conventional silver halide negative, and this is not subject to injury by the structures of this device.

After the image on plate 29 is used as desired, it is often desirable to change switch 19 so that pump 17 creates a pressure greater than atmospheric. This forces air through the pores of plate 7 and thus blows dirt and impurities out which might have been brought in while the vacuum existed. In certain environments and when a plate 7 has a larger pore size, this periodic reversal of the direction of the air flow may be unnecessary.

If desired, the porous plate 7 may be non-planar and formed into a field lens surface, as required by some optical designs. The second plate 23 would be non-porous, planar or non-planar, as convenient to the lens system designer.

While the invention has been particularly shown and described with reference to preferred embodiments thereof, it will be understood by those skilled in the art that the foregoing and other various changes in form and details may be made therein without departing from the spirit and scope of the invention.

I claim:
1. An optical system for producing and collecting light and projecting that light through a transparency located substantially on an object plane, and then through optic structures conform an image from said transparency on a focal plane wherein the improvement comprises,
   a rigid light transmitting porous body mounted in said system, said body having one face located to receive and support said transparency on the object plane of said system when said transparency is placed against said face,
   a closed chamber one wall of which is formed by said body,
   a pump,
   a conduit connecting said pump to said chamber, said conduit including switch means therein for selectively causing said pump to either create a vacuum or a pressure greater than atmospheric pressure in said chamber.
2. The combination as in claim 1 in which said porous body is a porous glass.
3. The combination as in claim 2 in which said porous glass has pores so small that light areas on said formed image appear substantially uniform.

References Cited

UNITED STATES PATENTS

| | | | |
|---|---|---|---|
| 2,584,401 | 2/1952 | Thralls | 88—24 |
| 2,645,153 | 7/1953 | Halpern | 88—24 |
| 2,941,461 | 6/1960 | Ludwig | 95—76 X |

NORTON ANSHER, *Primary Examiner.*

WAYNE A. SIVERTSON, *Assistant Examiner.*

UNITED STATES PATENT OFFICE
CERTIFICATE OF CORRECTION

Patent No. 3,433,564                      March 18, 1969

Roy J. Lahr

It is certified that error appears in the above identified patent and that said Letters Patent are hereby corrected as shown below:

Column 4, line 34, "conform" should read -- to form --.

Signed and sealed this 7th day of April 1970.

(SEAL)
Attest:

Edward M. Fletcher, Jr.                  WILLIAM E. SCHUYLER, JR.
Attesting Officer                            Commissioner of Patents